Oct. 17, 1961  J. STOCKY  3,004,468
APPARATUS FOR INVESTIGATION OF THE OCCURRENCE
OF SECONDARY AFTER IMAGES
Filed Nov. 16, 1956  3 Sheets-Sheet 1

INVENTOR.
Jan Stocký
BY

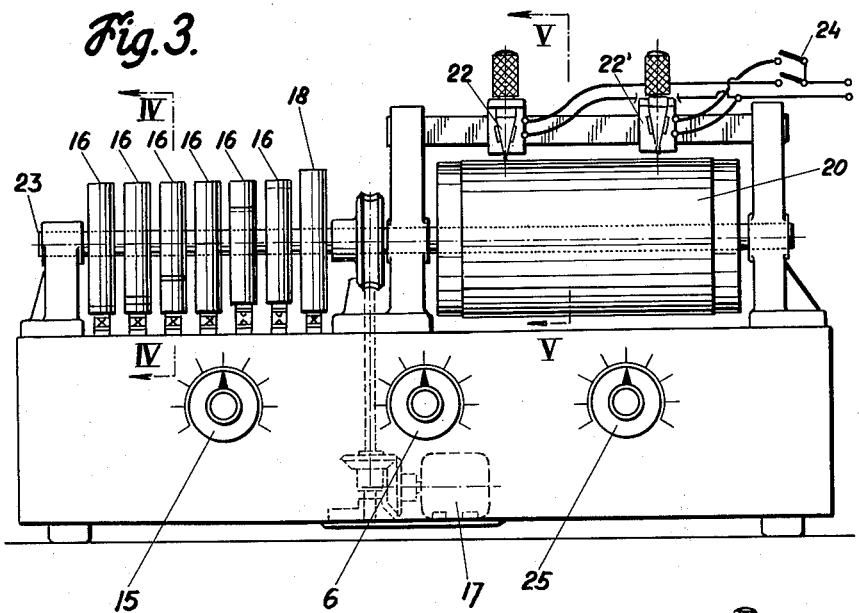
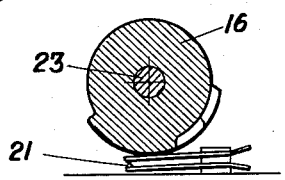
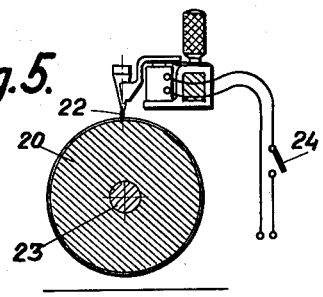

3,004,468
APPARATUS FOR INVESTIGATION OF THE OCCURRENCE OF SECONDARY AFTER IMAGES
Jan Stocky, 15 U divcich hradu, Prague, Czechoslovakia
Filed Nov. 16, 1956, Ser. No. 622,709
Claims priority, application Czechoslovakia Nov. 17, 1955
5 Claims. (Cl. 88—20)

When light impinges upon the retina of the eye, this stimulation is followed, under certain conditions, by a reaction of the sight organs, manifested by the appearance of the so called after-image. If we concentrate our eye upon a sufficiently lighted black surface, we see within a certain time a light band around this surface in complementary colors, which is referred to as the simultaneous induced image. If we concentrate our eye upon a place adjacent such induced image which is not conspicuous as to color, we see within a certain time, which is known as the latent period, an image of the same shape and dimensions in complementary colors, and this image is referred to as the induced secondary image.

The physiological phenomenon has been thoroughly studied and described as early as 1823 by J. E. Purkinje and thus these secondary induced images are frequently referred to in scientific papers as Purkinje's images.

It has been proved by experiments that this phenomenon takes place according to certain laws. A number of relations have been established between the irritation, i.e. the stimulation of the retina caused by the light impulse and the course of the reaction of the sight organs, i.e. the occurrence of the Purkinje images.

Although it is not possible at the present time to explain satisfactorily all aspects of this phenomenon, it may be said, on the basis of present knowledge, that it is an accompanying phenomenon of the restablishment of the dynamic equilibrium of the sight organs, which has been disturbed by the light energy impinging upon the retina. From the course by which the disturbed equilibrium is reestablished, and applying known principles of structural dynamic relations of neurophysiological phenomena, the functional and structural or anatomic state of the sight organ may be determined.

With this knowledge on hand, a method and an arrangement has been developed for measuring the normal and pathological course of the secondary induced images or the Purkinje images.

It is an object of this invention to provide a method and an apparatus which makes it possible to perform standard measurements of this phenomenon under different conditions which can be duplicated and which permit comparison of the results of different measurements and the drawing of reliable conclusions on the basis of these measurements.

An apparatus for measuring these so called Purkinje images is shown by way of example in the accompanying drawings, wherein:

FIG. 3 is a side elevational view of a control and recording unit employed with the apparatus of FIGS. 1 and 2;

FIG. 4 is a sectional view taken along the line IV—IV of FIG. 3;

FIG. 5 is a sectional view taken along the line V—V of FIG. 3; and

Figure 1:
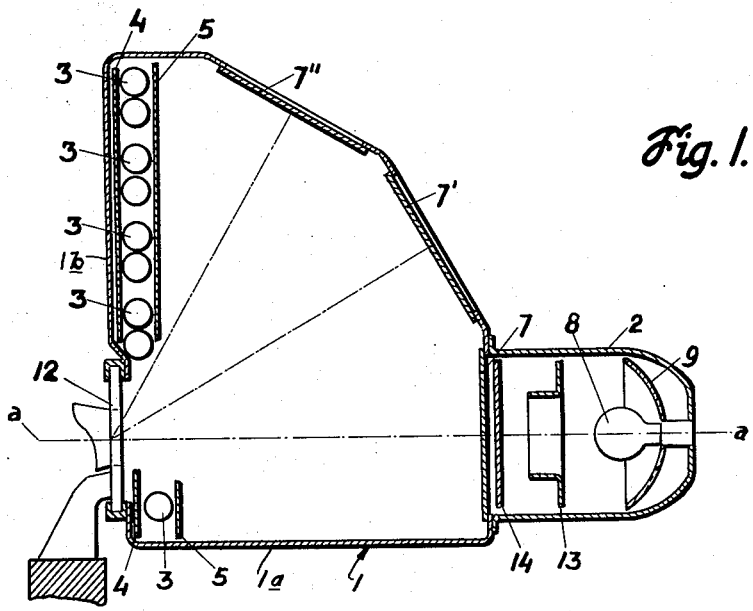
FIG. 1 is a vertical sectional view of an apparatus embodying this invention.
Figure 2:
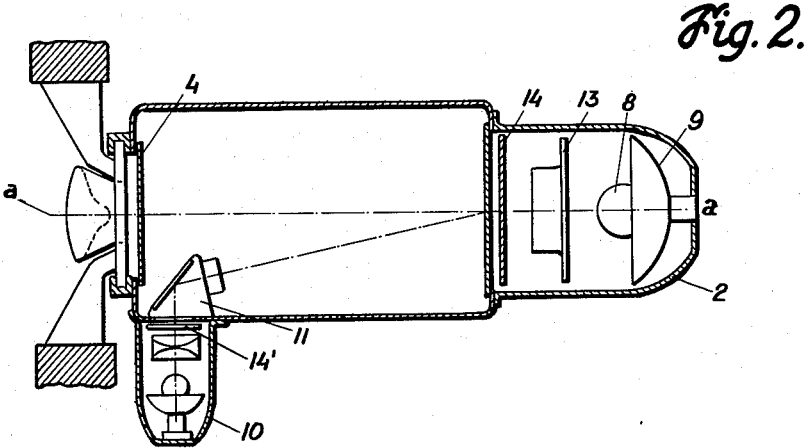
FIG. 2 is a horizontal sectional view of the apparatus of FIG. 1, but showing a modification thereof.

The apparatus according to FIGS. 1 and 2 comprises a light-tight housing 1 having two right angled walls 1a and 1b. Near the corner of the housing between walls 1a and 1b an eye piece 12 is provided, which may be rotated around its optical axis with respect to the housing. Perpendicular to the optical axis of eye piece 12 an observation screen 7 is arranged inside the housing. Similar screens 7' and 7" are arranged successively in edge to edge relationship with each screen being disposed at an obtuse angle to the preceding screen, the distances of the eye piece 12 from the centers of the screens 7, 7', 7" being substantially equal. Further, the planes of the screens are perpendicular to the connecting lines between the centers of the screens and the eye piece 12.

These screens, which are dull, are basically illuminated by diffused light from electric lamps 3 arranged against the wall 1b behind a diffusing screen 5. In order to increase the effect of the illumination, a mirror 4 is placed against the wall 1b of the housing 1 for reflecting the light rays directed toward the wall, back to the screen 5. The electric lamps 3 are supplied with electric current by way of a suitable electric circuit (not shown) including calibrated regulating resistances, and standard resistances and are switched on by the switch 6 (FIG. 3). The calibrated regulating resistances or rheostats and standard resistances included in the electric circuit for energizing the lamps 3 are respectively controlled by knobs 15 and 25.

The desired light effects may be established upon the observation screens 7, 7', 7" in two different ways.

In one embodiment, the wall of housing 1 is removed behind the screen 7 and a casing 2 attached to house an illuminating body 8 (for example, a krypton lamp), arranged at the focus of a parabolic mirror 9. To receive parallel light rays for a uniform illumination of the screen 7 a matrix 13 with tubus and collector is interposed between the screen 7 and the illuminating body 8.

Adjacent to the screen 7 colored diaphragms 14 may be inserted into the path of the light rays from the illuminating body 8, such diaphragms being advantageously in the form of colored films.

Similar casings may be provided for the screens 7' and 7", or the walls of the housing behind the screens may be replaced by removable shutters and the casing 2 may be, after removal of the related shutter, placed behind any of the screens 7, 7', or 7".

Illumination of the observation screens in accordance with another embodiment is shown in FIG. 2. A diascope 10 is arranged close to the eye piece 12 and the light rays from said diascope are projected by a mirror 11 which is rotatable around the axis of the diascope to direct the reflected light rays toward any of the observation screens 7, 7', 7". Colored diaphragms 14' may be again inserted into the pathway of the light rays as in the embodiment of the invention using the casing 2.

The observation screen 7 serves for the investigation of the center of the retina, while the screens 7' and 7" are used for the investigation of the periphery of the retina. To allow investigations along the entire circle around the center of the retina, the whole housing 1 is arranged on a support which is rotatable around the optical axis of the eye piece 12, the eye piece 12 itself remaining stationary.

The control of the duration of illumination of the observation by the illuminating body 2 or by the diascope 10 is accomplished by a camshaft (FIGS. 3, 4 and 5) which includes cams 16 fixed on a shaft 23 to effect closing for a certain predetermined time of contacts 21 which are interposed in the supply circuits for the illuminating body 2 or for the diascope 10. A further cam 18 of circular shape serves for a continuous closing of related contacts 21.

The shaft 23 is driven by a synchronised electric motor 17 by way of suitable gearing.

A drum 20 is also fixed on the shaft 23 and carries a recording strip while recording electrically energized pencils 22 and 22' actuated by hand switch 24 are arranged close to the drum 20.

The measurements are accomplished in the following way. The investigated person puts his eye, or if the apparatus is arranged for simultaneous investigation of both eyes, both eyes to the piece 12 and concentrates upon the center of the observation screen 7. After the time required for accommodation of the eye to the conditions within the housing has elapsed the shaft 23 is made to rotate and one of the cams 16 closes the illuminating circuit for a predetermined time, causing an image to appear upon the screen 7. The investigated person presses the switch 24 at the beginning of the illumination and holds it closed during the whole period of illumination. Thus the time of illumination is recorded. The recording pencil 22 traces a line on the recording strip on the part of the strip (FIGS. 6 to 9). Thereafter the latent period follows, represented on the recording strip by the part *l*. As soon as the induced image appears to the investigated person, he presses the switch 24 again and holds it closed for the time of its duration, as represented by the part *n* of the recording strip.

This process may be repeated for different lengths of exposure and the recording pencil is shifted with respect to the recording strip so that the lines representing successive tests will be suitably spaced apart. Similarly another of the cams 16 may be simultaneously put into action.

The second recording pencil 22' may be simultaneously used for recording sound impulses, so that the device may be used both for sight and sound analysis.

If the peripheries of the retina have to pe investigated, the device is used in a similar way, but the screens 7' and 7" are now employed. The housing 1 is revolved in successive angular steps around the axis of the eye piece 12 to allow an investigation along a circular path.

Figure 6:
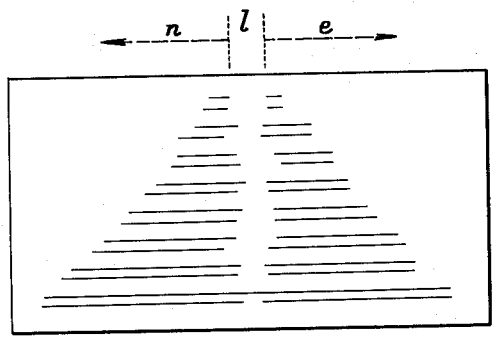
FIGS. 6, 7, 8 and 9 show samples of recordings obtained with the apparatus of FIGS. 1 to 5, inclusive.
Figure 7:
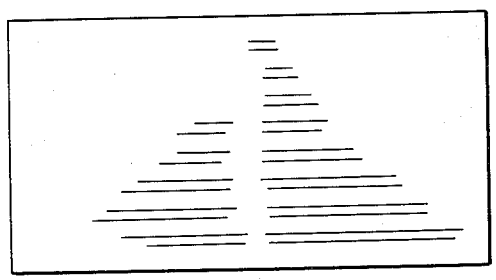
Figure 8:
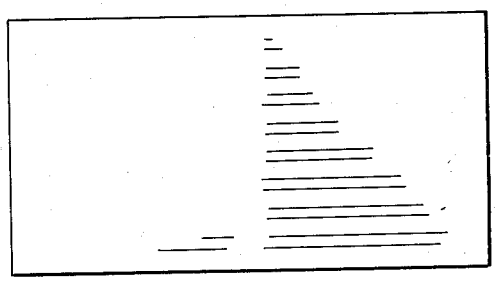
Figure 9:
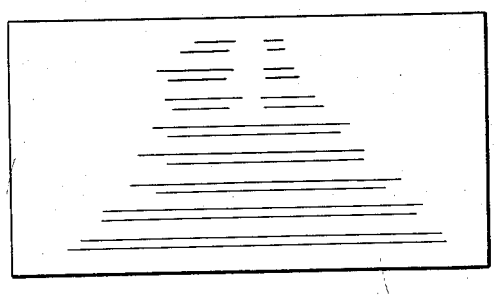

FIGS. 6 to 9 show some characteristic records made by the device according to the invention. FIG. 6 shows a record of a normal person. FIGS. 7 to 9 are records of different thresholds of sensibility, different latent periods and qualities and different durations of the secondary image.

It has been impossible with apparatus used hitherto for investigations of this kind to achieve standard records, which would allow the drawing of reliable conclusions therefrom. Responses to stimuli of equal duration have been generally recorded, or results were computed for different conditions, which failed to provide a reliable picture of the condition of the investigated person.

The method according to this invention ensures standard measuring conditions, the same distance of the eye from the illuminated screen and a standard illumination thereof with equal conditions for accommodation. It is furthermore possible to change the standard irritations as to quality and quantity, so that one can follow the course of the phenomenon as to its physiological dynamics and also follow the course of the respective responses, i.e. the appearance and duration of the secondary images at the same place where the irritation has been accomplished. The latter is according to the present knowledge of electro-retinography very important.

A semiautomatic recording of the response to different stimulations is possible, i.e. to colored or not colored images. The recording is controlled by a simple pressing of a switch and provides the course of the phenomenon in its physiological sequence and allows a direct analysis and comparison of different measurements.

By inserting differently colored filters or screens which are advantageously in the form of films, it is possible to judge rather accurately, on the basis of the composition of light and colors, the quality of the response, i.e. the light intensity and the frequency of the secondary image. After the secondary image appears, it is possible to project upon the respective screen a new image in complementary colors of the color of the secondary image and of a light intensity which may be determined empirically, so that the secondary image will be compensated by the addition of colors and completely disappears.

The quality of the stimulation may be changed uniformly by using filters of different colors, different color combinations and light intensities. The latter may be achieved by using different standard resistances or rheostats.

The above described method is rather important for typological studies and overcomes the difficulties encountered hitherto due to the unreliability of the measured values.

On the basis of elaborate studies of the functional structural foundation of the induced images it has been possible to prove that the deviations of the time of response and of the quality of the reestablishment of the dynamic equilibrium of the sight organ are in close relation to slight disturbances not only of the receiving part of the sight organ but also of the pathway of the optic nerves and their termination on the cerebral core. It has been proved in many cases that disturbances of the circulation which are not yet anatomically observable, as for example increase of the intercranal pressure and the like, may be determined by means of the sensitive measurement of the induced images in accordance with this invention. For example, it has been possible to find, in a young patient, the initial indications of a hypertension, although it was possible to prove it clinically only much later.

It may be taken for granted that for hypertension and arteriosclerosis of the cerebral arteries the method embodying this invention offers a valuable aid in the differentiating diagnosis, namely the initial stage, where the results of other investigations, for example, results of examinations of the eye orbit, are still negative.

The same holds true about initial changes of the intracranal pressure, which are manifested rather early in changes of the course of the appearance of the secondary image, both as to quality and qauntity, while the clinical investigations show still the normal condition or give a rather unclear picture.

The method has been also tried for investigations of endocrinological disturbances and showed the typical course of the reaction of the sight organ at thyreotoxicosis.

What I claim is:

1. An apparatus for investigation of the occurrence of secondary after images comprising a light tight housing, means for generally illuminating the inside of said housing with diffused light, a plurality of observation screens inside said housing, an eye piece in a wall of said housing disposed with its optical axis intersecting the center of one of said screens for concentrating the sight of the investigated person on said one screen, the distances from all of said screens to said eyepiece being equal, said housing being rotatable with respect to said eye piece around the axis of said eye piece, means for projecting upon a selected one of said screens lighted images of predetermined color and light intensity for a predetermined time, and means for recording the duration of the illumination of the screen upon which said image is projected, of the latent interval thereafter, and of the time of the subsequent appearance and waning of the secondary image.

2. An apparatus for investigation of the occurrence of secondary after images, comprising a light tight housing, means for generally iluminating the inside of said housing with diffused light, a plurality of observation screens inside said housing, an eye piece in a wall of said housing disposed with its optical axis intersecting the center of one of said screens for concentrating the sight of the investigated person on said one screen, the other observation screens being arranged at obtuse angles to said one screen, the plane of each of said observation screens being substantially perpendicular to a connecting line between said eye piece and the center of the related observation screen, the distances from said screens to said eye piece being equal, said housing being rotatable with respect to said eye piece around the optical axis of said eye piece, means for projecting upon a selected one of said screens lighted images of predetermined color and light intensity for a predetermined time, and means for recording the duration of the illumination of the selected screen with said image, of the latent interval thereafter, and of the time of the subsequent appearance and waning of the secondary image.

3. An apparatus for investigation of the occurrence of secondary after images comprising a light tight housing, means for generally illuminating the inside of said housing with diffused light, a plurality of observation screens inside said housing, an eye piece in a wall of said housing disposed with its optical axis intersecting the center on one of said screens for concentrating the sight of the investigated person on said one screen, said housing being rotatable with respect to said eye piece around the axis of said eye piece, means for projecting upon said screens lighted images of predetermined color and light intensity, a cam shaft carrying cams corresponding to said screens for controlling the time of illumination of the related screens with said images, means for driving said cam shaft, and means for recording the duration of illumination of said screens with said images, of the latent intervals thereafter and of the times of the subsequent appearance and waning of the secondary images.

4. An apparatus for investigation of the occurrence of secondary after images comprising a light tight housing, means for generally illuminating the inside of said housing with diffused light, a plurality of observation screens inside said housing, an eye piece in a wall of said housing disposed with its optical axis intersecting the center of one of said screens for concentrating the sight of the investigated person on said one screen, said housing being rotatable with respect to said eye piece around the axis of said eye piece, a diascope disposed adjacent of said eye piece and having a rotatable mirror system for projecting upon a selected one of said observation screens an image of predetermined color and light intensity for a predetermined time, and means for recording the duration of the illumination of the selected screen with said image, of the latent interval thereafter, and of the time of the subsequent appearance and waning of the secondary image.

5. An apparatus for investigation of the occurrence of secondary after images, comprising a light tight housing, means for illuminating the inside of said housing with diffused light, a plurality of observation screens inside said housing, an eye piece in a wall of said housing disposed with its optical axis intersecting the center of one of said screens for concentrating the sight of the investigated person on said one screen, said housing being rotatable with respect to said eye piece around the axis of said eye piece, means for projecting upon said screens lighted images of predetermined color and light intensity, a cam shaft carrying cams corresponding to said screens for controlling the times of illumination of said screens with said images, a recording drum fixed on said cam shaft, recording pencils cooperating with said drum, a hand operated switch intended for actuation by the investigated person for actuating said recording pencils, and means for driving said cam shaft.

References Cited in the file of this patent

UNITED STATES PATENTS

| | | |
|---|---|---|
| 404,366 | Stanley | May 28, 1899 |
| 1,115,408 | De Zeng | Oct. 27, 1914 |
| 1,354,900 | Frank | Oct. 5, 1920 |
| 1,795,752 | Bauersfeld et al. | Mar. 10, 1931 |
| 1,796,359 | Cameron | Mar. 17, 1931 |
| 1,903,502 | Campbell | Apr. 11, 1933 |
| 2,224,564 | De Silva | Dec. 10, 1940 |
| 2,234,240 | Frohling et al. | Mar. 11, 1941 |
| 2,328,700 | Wiltberger | Sept. 7, 1943 |
| 2,374,854 | Feinbloom | May 1, 1945 |
| 2,770,999 | Older | Nov. 20, 1956 |

FOREIGN PATENTS

| | | |
|---|---|---|
| 280,236 | Switzerland | Apr. 16, 1952 |

OTHER REFERENCES

U.S. Naval Medical Bulletin; Metcalfe article, vol. XXXVIII (April 1940), pages 231–238, copy of bulletin in National Library of Medicine.

The Optician (British) magazine; vol. C II, No. 2638 (October 17, 1941), page 145.

A. O. pamphlet, Vision, vol. 25, No. 4, copyright 1941 by American Optical Co., pages 4 and 5.